United States Patent [19]
Bright et al.

[11] Patent Number: 5,109,696
[45] Date of Patent: May 5, 1992

[54] POWERTRAIN PERFORMANCE ASSESSMENT SYSTEM

[75] Inventors: Irving Bright; Ronald C. Erickson, both of Peoria, Ill.; Dennis K. Greene, Walnut Creek, Calif.; Gerald D. Hardy, Metamora, Ill.; Robert E. Hefner, Creve Couer, Ill.; Lowell E. Johnson, East Peoria, Ill.; Donald J. Schwingel, Peoria, Ill.; Richard E. Spring, Washington, Ill.

[73] Assignee: Caterpillar Inc., Peoria, Ill.

[21] Appl. No.: 578,990

[22] Filed: Sep. 6, 1990

[51] Int. Cl.$^5$ .................................. G01M 15/00
[52] U.S. Cl. .................................... 73/118.1
[58] Field of Search ................... 73/118.1, 162; 364/424.03, 424.04

[56] References Cited

U.S. PATENT DOCUMENTS

| 3,273,384 | 9/1966 | Flaugher | 73/118.1 |
| 3,302,107 | 1/1967 | Flaugher et al. | 73/118.1 |
| 5,027,647 | 7/1991 | Shimanaka | 73/118.1 |

FOREIGN PATENT DOCUMENTS 0067540 3/1988 Japan ........................... 73/118.1

Primary Examiner—Robert Raevis
Attorney, Agent, or Firm—James R. Yee

[57] ABSTRACT

An apparatus is adapted to assess the performance of a vehicle's powertrain. A microcomputer collects sensor data indicative of the rotational velocity of an output shaft and a transmission input shaft and of the pressure of a directional clutch and a speed clutch. The microcomputer calculates a set of powertrain parameters based on the collected sensor data and produces an error signal in response to predetermined conditions of the powertrain parameters.

43 Claims, 9 Drawing Sheets

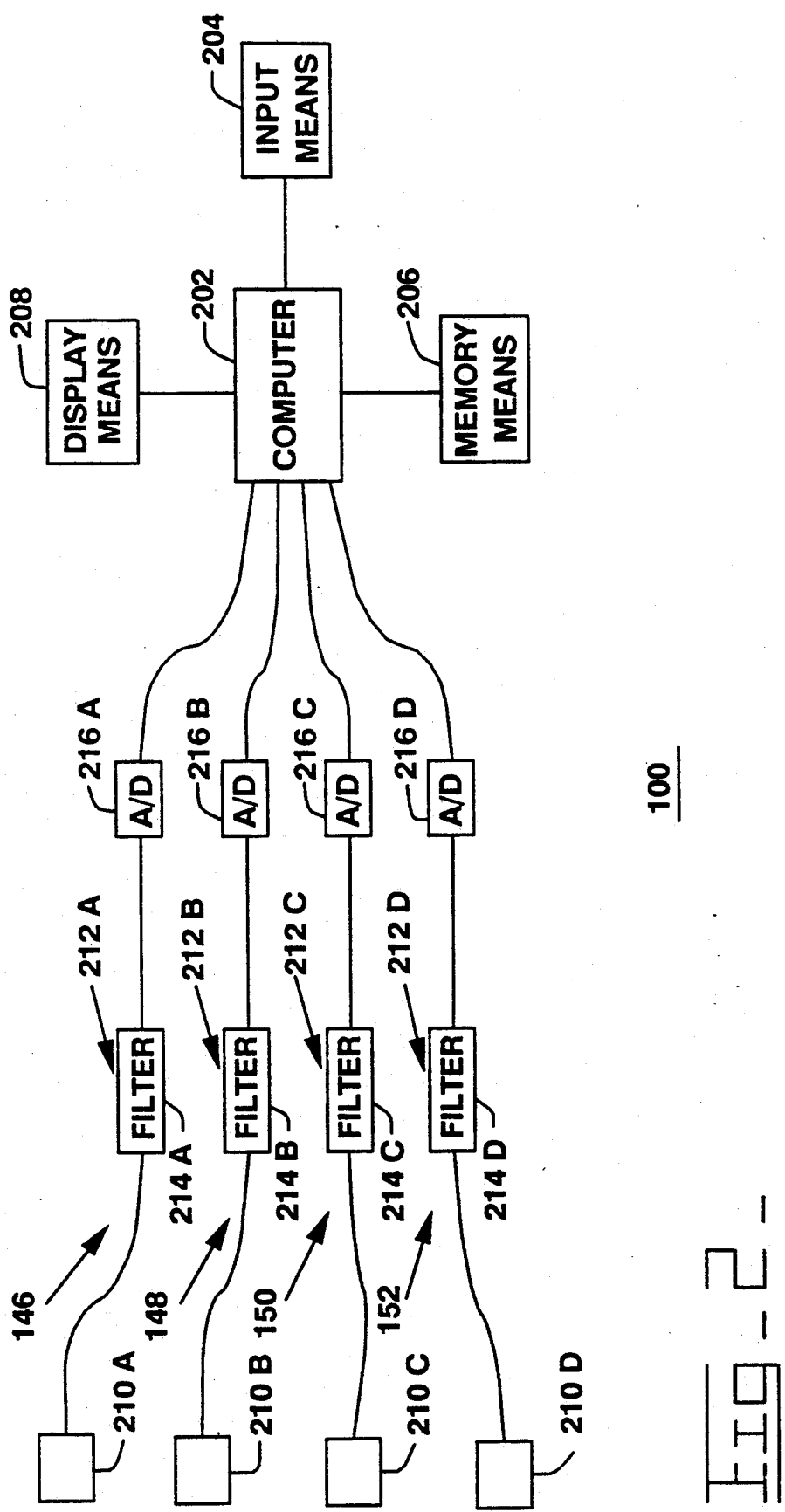

| TEST # | TEST TYPE | ENGINE GOVERNOR SETTING | IMPLEMENT HYDRAULIC | TRANSMISSION SETTING | STEERING CLUTCHES |
|---|---|---|---|---|---|
| 1 | SLIP | HI | OFF | N - 3F | ENGAGED |
| 2 | SLIP | HI | OFF | N - 3R | ENGAGED |
| 3 | SLIP | HI | OFF | N - 2F | ENGAGED |
| 4 | SLIP | HI | OFF | N - 2R | ENGAGED |
| 5 | SLIP | HI | OFF | N - 1F | ENGAGED |
| 6 | SLIP | HI | OFF | N - 1R | ENGAGED |
| 7 | SLIP | LI | OFF | N - 3F | ENGAGED |
| 8 | SLIP | LI | OFF | N - 3R | ENGAGED |
| 9 | SLIP | LI | OFF | N - 2F | ENGAGED |
| 10 | SLIP | LI | OFF | N - 2R | ENGAGED |
| 11 | SLIP | LI | OFF | N - 1F | ENGAGED |
| 12 | SLIP | LI | OFF | N - 1R | ENGAGED |
| 13 | ACCEL | LI-HI | OFF | N | ENGAGED |
| 14 | ACCEL | LI-HI | OFF | 3F STALL | ENGAGED |
| 15 | ACCEL | LI-HI | ON | 3F STALL | ENGAGED |
| 16 | ACCEL | LI-HI | OFF | 1F | DISENGAGED |
| 17 | ACCEL | LI-HI | OFF | 2F | DISENGAGED |
| 18 | ACCEL | LI-HI | OFF | 3F | DISENGAGED |

Fig_3_

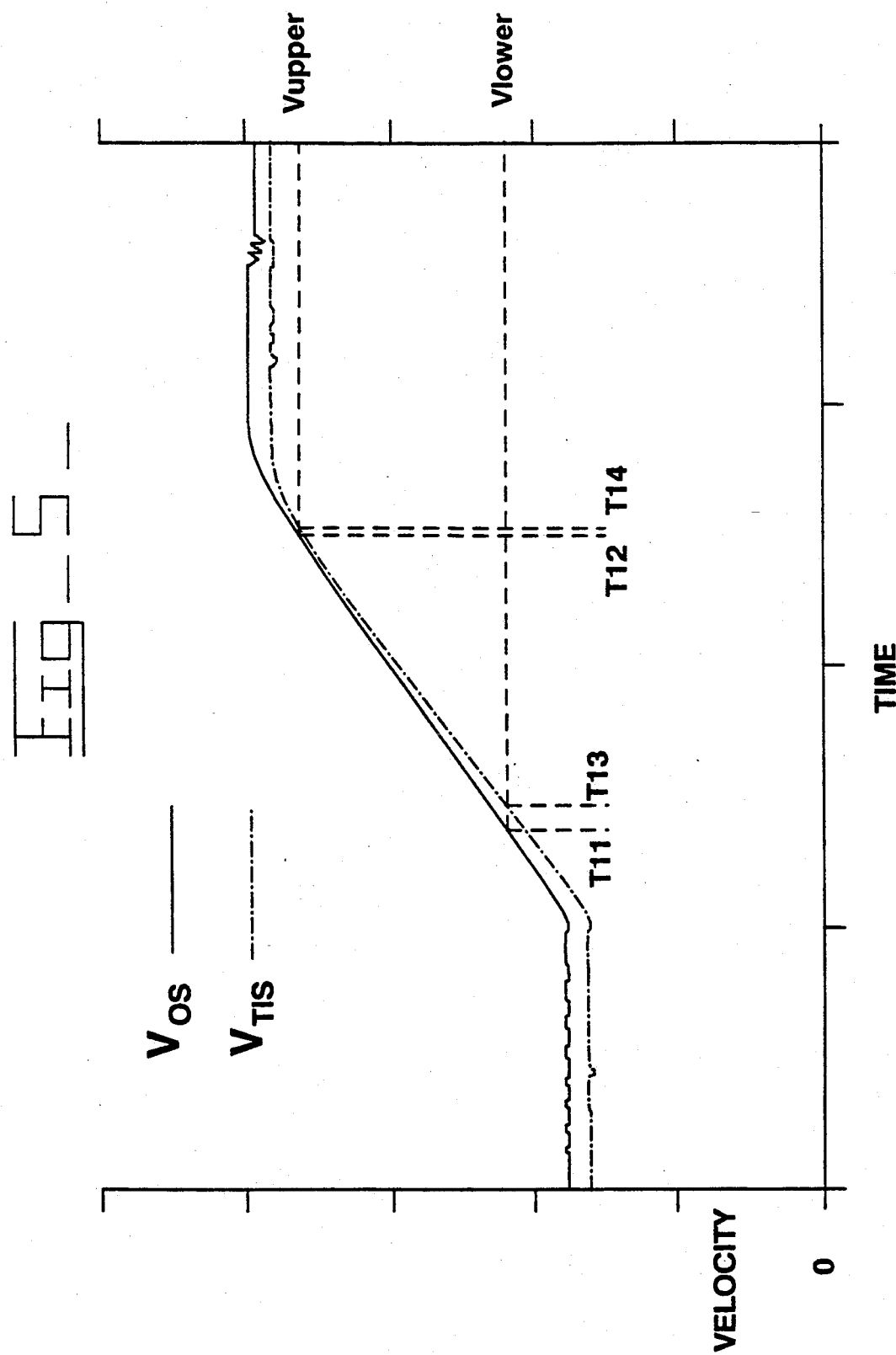

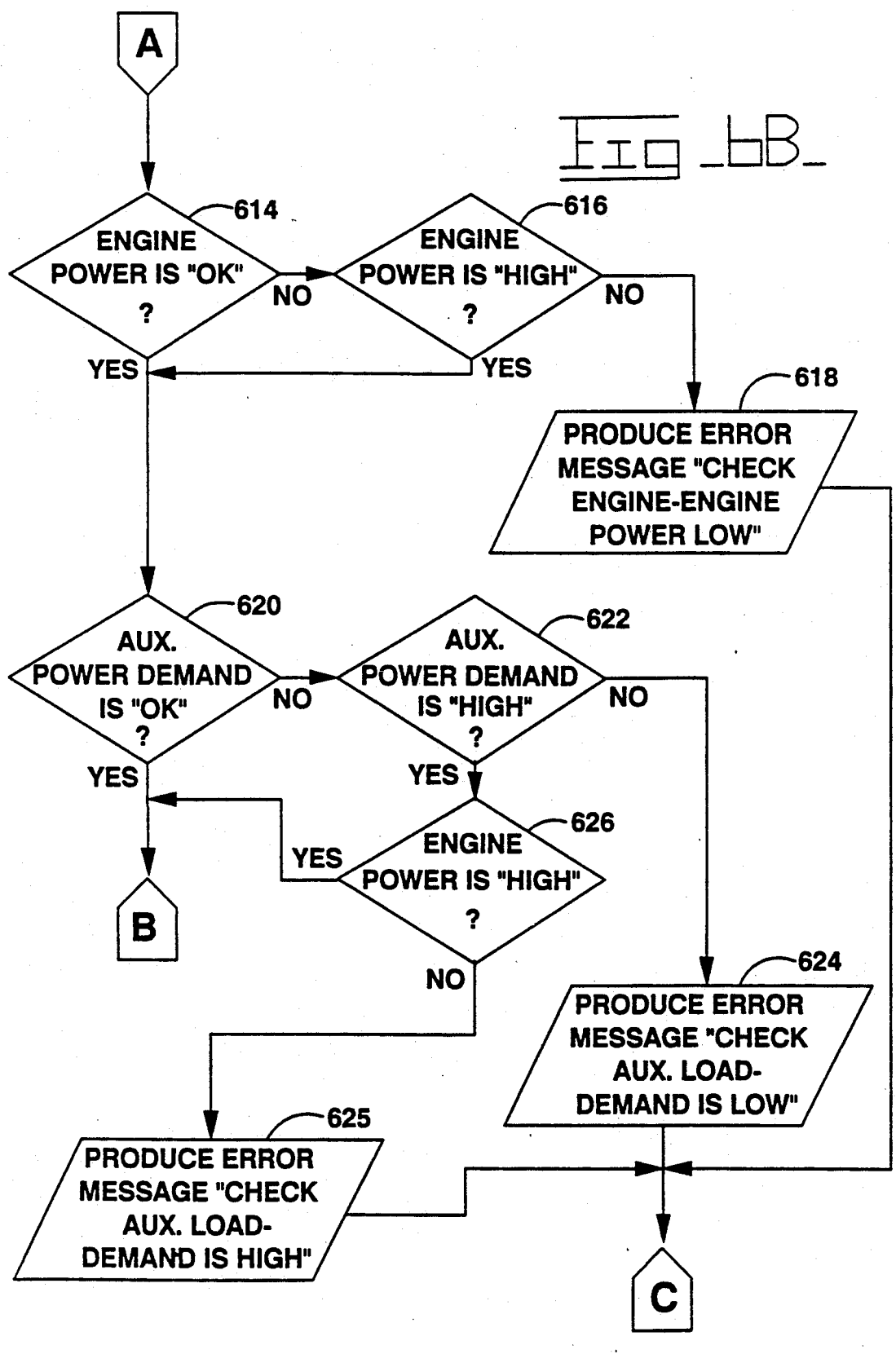

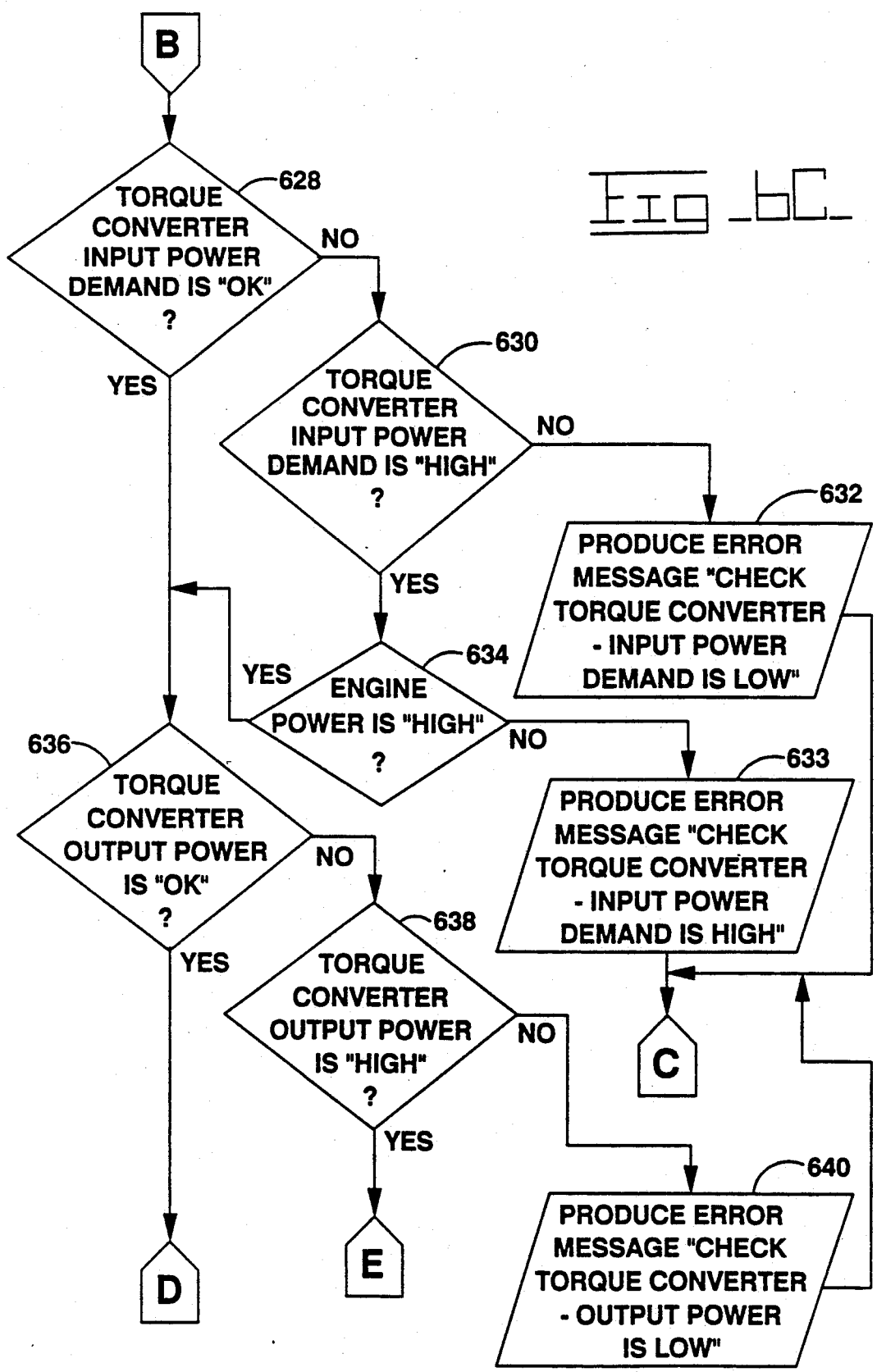
Fig_6C_

POWERTRAIN PERFORMANCE ASSESSMENT SYSTEM

DESCRIPTION

1. Technical Field

This invention relates generally to an apparatus and method for assessing the performance of a vehicle's powertrain and more particularly, to an apparatus and method for assessing the performance of the powertrain components.

2. Background Art

Proper maintenance of a powertrain is an important priority in the daily operation of a vehicle. Degradation in the powertrain's performance affects the efficiency of the vehicle's operation, the fuel consumption, and the engine's exhaust emissions.

Typically, a powertrain supplies power to a ground engaging means which may include tires or an endless track. On work vehicles, the powertrain also supplies power to an auxiliary load. For example, on a track-type tractor, the powertrain supplies power to the tracks for moving the vehicle and also supplies power (through a hydraulic system) to the linkages which control the tractor's bulldozer. Degradations in the powertrain's performance affects the power available to the hydraulic system and the ground engaging means and therefore causes a loss of efficiency in the work cycle of the vehicle.

Furthermore, performance degradations may be a forewarning of failures and may consequently lead not only to costly repairs, but also unnecessary downtime. Proper maintenance ensures that the powertrain is performing correctly. It is therefore desirable to detect degradations in the powertrain's performance prior to a resultant failure.

In the past, a dynamometer or strain gage has been used to determine changes in power at various points in the powertrain. Through analysis of the power changes in the powertrain under specific test conditions, an assessment of the powertrain's performance can be made. For example, to determine the power available at the output of the engine, a dynamometer is connected to the output shaft of the engine.

To complete the assessment of the powertrain's performance, torque converter input demand, torque converter output power and transmission input power demand and output power may also be measured. If a dynamometer or strain gage is used, a substantial amount of time is required to partly dismantle the powertrain and to connect the dynamometer or strain gage to the powertrain. The more complete the assessment, the more time required.

The present invention is directed at overcoming one or more of the problems as set forth above.

DISCLOSURE OF THE INVENTION

In one aspect of the present invention, an apparatus for assessing the performance of a powertrain is provided. The powertrain includes a prime mover for rotating an output shaft, a torque converter unit driven by the output shaft, and a transmission having a transmission input shaft and at least one directional clutch and one speed clutch. The apparatus includes sensors for sensing the pressure of the speed clutch and the directional clutch and the rotational velocity of the output shaft and the rotational velocity of the transmission input shaft. The apparatus calculates a set of powertrain parameters based on the sensor data and produces an error signal in response to predetermined conditions of the powertrain parameters.

In another aspect of the present invention, a method for assessing the performance of a powertrain is provided. The powertrain includes a prime mover for rotating an output shaft, a torque converter unit driven by the output shaft, and a transmission having a transmission input shaft and at least one directional clutch and one speed clutch. The method includes the steps of: sensing the pressure of the speed clutch, the pressure of the directional clutch, the rotational velocity of the output shaft, and the rotational velocity of the transmission input shaft. A set of powertrain parameters is calculated based on the sensor data and an error signal is produced in response to predetermined conditions of the powertrain parameters.

BRIEF DESCRIPTION OF THE DRAWING

FIG. 2 is a block diagram of the powertrain performance assessment system, according to the present invention;

FIG. 3 is a chart illustrating the powertrain conditions required during the test runs;

FIG. 5 is a sample graph, illustrating engine output shaft velocity and transmission input shaft velocity during an acceleration test; and FIGS. 6A-D constitute a flow diagram of an embodiment of the powertrain performance assessment system, according to the present invention.

BEST MODE FOR CARRYING OUT THE INVENTION

Figure 1:
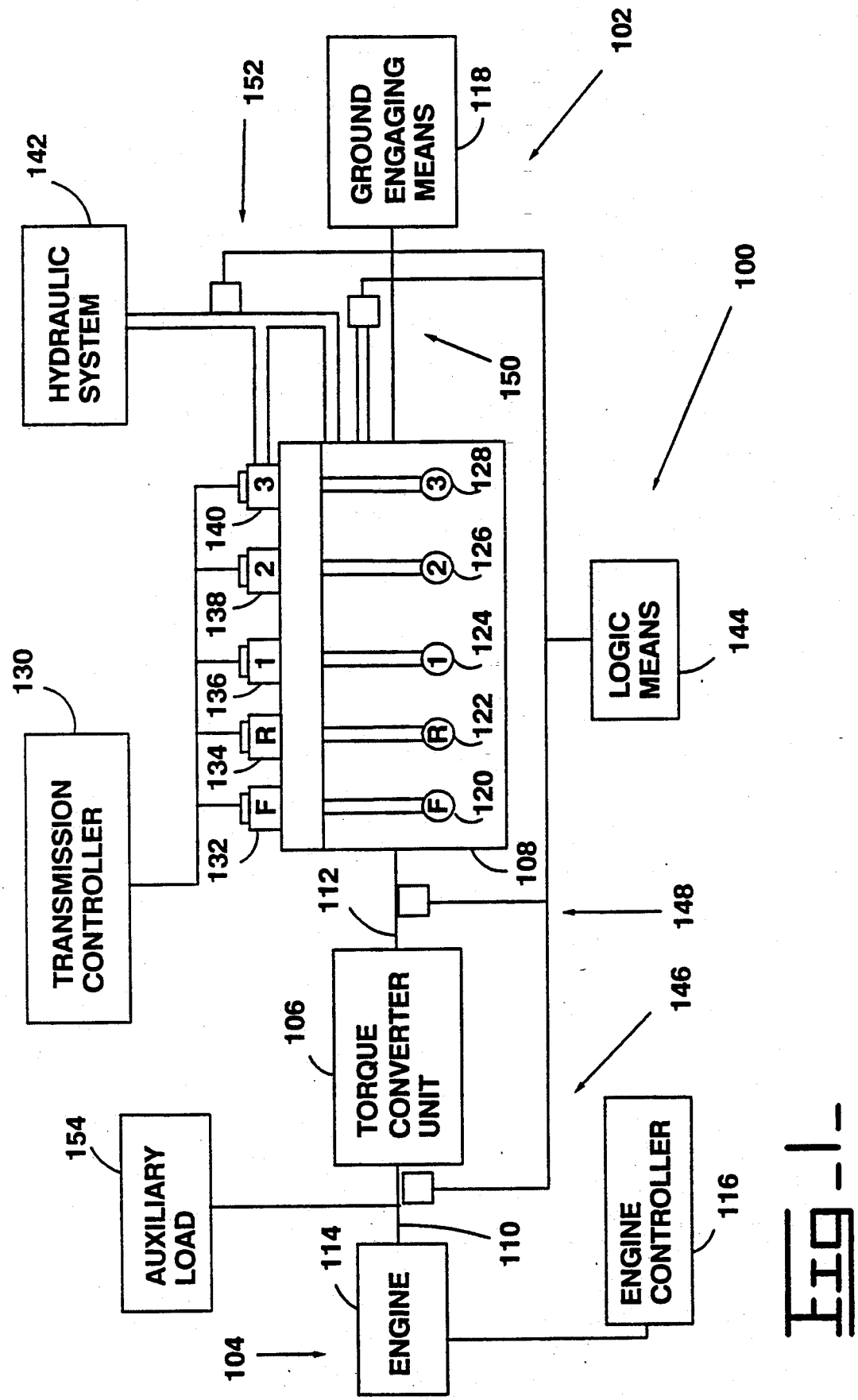
FIG. 1 is a block diagram of a powertrain performance assessment system connected to a powertrain.

With reference to FIG. 1, an apparatus 100 is adapted to assess the performance of a powertrain 102. The powertrain 102 includes a prime mover 104, a torque converter unit 106, and a transmission 108.

The output shaft 110 drives the torque converter unit 106. The torque converter unit 106 transmits and amplifies torque from the output shaft 110 of the prime mover 104 (engine output shaft). In one embodiment, the torque converter unit 106 includes a torque converter, not shown, and in another embodiment, the torque converter unit 106 includes a torque converter and a planetary gear set, not shown. The planetary gear set divides torque between the torque converter and the transmission 108. Various torque converter unit configurations are possible and well known in the art. Use of a specific configuration is arbitrary to the present invention and is therefore not further discussed.

The prime mover 104 includes an engine 114 and an engine controller 116. In one embodiment, the engine 114 is a diesel engine, and in another embodiment, the engine 114 is a spark-ignited engine.

The engine controller 116 controls rotational velocity of the output shaft 110 (engine speed) and therefore, the power output of the engine 114. In one embodiment, the engine controller 116 is a governor, which controls the amount of fuel delivered to the engine 114 in response to movement of an accelerator linkage (not shown). In another embodiment, the engine controller 116, is an electronic control module (ECM), not shown, which electronically controls the amount of fuel delivered to the engine. The use of both the governor and an ECM to control the amount of fuel delivered to the engine are well known in the art and are therefore not further discussed.

The transmission 108 includes a transmission input shaft 112 (driven by the torque converter unit 106) and supplies power to a ground engaging means 118. In one embodiment, the ground engaging means 118 includes a set of tires, not shown, and in another embodiment the ground engaging means includes an endless track.

The transmission 108 includes at least one directional clutch and one speed clutch which controllably allow the transmission 108 to be shifted between a plurality of gear ratios. In the preferred embodiment, the transmission 108 includes a forward clutch 120, a reverse clutch 122, a first speed clutch 124, a second speed clutch 126, and a third speed clutch 128.

A transmission controller 130 controllably engages and disengages the clutches 120,122,124,126,128 to shift the transmission 108 between NEUTRAL, FORWARD, and REVERSE gear positions. In an exemplary embodiment, the transmission 108 is shiftable between three FORWARD (1F,2F,3F) and three REVERSE (1R,2R,3R) gear positions.

In one embodiment, the transmission controller 130 includes a plurality of pilot operated solenoid valves 132,134,136,138,140 which are used in conjunction with a hydraulic system 142 to controllably engage and disengage the clutches 120,122,124,126,128 in response to signals from the transmission controller 130. In another embodiment, the transmission controller 130 includes a plurality of hydro-mechanical valves connected to a control lever through mechanical linkages (not shown). Transmission controllers of either type are well known in the art and are therefore not further discussed.

In the preferred embodiment, the apparatus 100, hereafter referred to as a powertrain performance assessment system (PPAS), is adapted to collect test data during predetermined test situations (discussed below). The PPAS 100 includes a logic means 144, means 146 for sensing the rotational velocity of the output shaft 110 ($V_{OS}$), means 148 for sensing the rotational velocity of the transmission input shaft 112 ($V_{TIS}$), means 150 for sensing directional clutch pressure, and means 152 for sensing speed clutch pressure.

In one embodiment, the PPAS 100 is integrated with the transmission controller 130 and the engine controller 116 and is located on the vehicle. In a second embodiment, the PPAS 100 includes an external data acquisition system (DAS). One such suitable DAS is the TECHSTATION available from Onsite Instruments of Mountain View, Calif.

Also shown, the prime mover 104 supplies power to an auxiliary load 154. In the preferred embodiment, the auxiliary load 154 includes a work implement. The prime mover 104 delivers power to the work implement's hydraulic system, not shown, in a manner well known in the art.

In the preferred embodiment, steering clutches (not shown) control the power delivered to the tracks during steering.

Advantageously, the PPAS 100 includes a microcomputer 202, an input means 204, a memory means 206, and a display means 208, as shown in FIG. 2. Typically, the input means 204 is a keyboard which is used to control the collection of data during the test runs. The microcomputer 202, is used to collect the data from the sensing means 146,148,150,152 and to calculate a set of powertrain parameters. The memory means 206, which may include Random Access Memory (RAM), Read Only Memory (ROM), a magnetic storage device, for example, a floppy disk drive or a hard disk drive, or any combination thereof is used to store data used by the microcomputer 202.

The display means 208 displays test instructions and data during the test, and information regarding the performance of the powertrain 102. The display means 208 may include a printer, a plotter, a cathode ray tube (CRT), a liquid crystal display (LCD), any combination thereof, or any similar device without straying from the spirit of the invention. The operation of the logic means 144 is discussed further below.

The output shaft velocity sensing means 146 and the transmission input shaft velocity sensing means 148 each include a sensor (tachometer) 210A,210B for sensing the rotational velocity of the respective shaft (110,112). The directional and speed clutch pressure sensing means 150,152 each include a pressure sensor 210C,210D for sensing the respective pressure.

Each sensing means 146,148,150,152 is connected to the microcomputer 202 through sample producing means 212A,212B,212C,212D for sampling the sensor signals at discrete time intervals. Typically, the sensor signals are sampled approximately 100 times a second. However, the sampling rate is dependent on the hardware configuration and is arbitrary to the present invention.

Each sample producing means includes a filter 214A,214B,214C,214D for reducing the amount of noise present in the electrical signals from the sensors 210A,210B,210C,210D and an analog to digital converter (A/D) 216A,216B,216C,216D.

In the preferred embodiment, sensor data is collected during eighteen tests. Two types of tests are run: slip tests and acceleration tests.

In each slip test, the engine 114 is set at a predetermined idle and the transmission 108 is shifted from NEUTRAL to one of the FORWARD or REVERSE gear positions. In the acceleration tests, the engine is accelerated from low idle to high idle against various loads provided by 3F stall, the work implements hydraulic system, and transmission inertias (provided by steering clutches, not shown). The digitized signals may be displayed on the display means 208 during each test.

With reference to FIG. 3, 12 slip tests and 6 acceleration tests are performed (numbered 1-18). In the first 6 slip tests, the engine is held at high idle (HI), power is not supplied to the work implement's hydraulic system, the steering clutches are engaged, and the vehicle's brakes are applied, and the transmission is shifted from NEUTRAL (N) to one of the FORWARD or REVERSE gear positions (1F,2F,3F,1R,2R,3R). In the last 6 slip tests, the transmission is again shifted from NEUTRAL (N) to one of the FORWARD or REVERSE gear positions (1F,2F,3F,1R,2R,3R), with the engine in low idle (LI) and all else remaining the same. In all slip tests, after the torque converter is stalled (transmission input shaft velocity equals zero), the steering clutches are disengaged, allowing the transmission input shaft velocity to recover.

During the slip tests, the digitized signals from the sensing means 146,148,150,152 are stored in the memory means 206.

Figure 4:
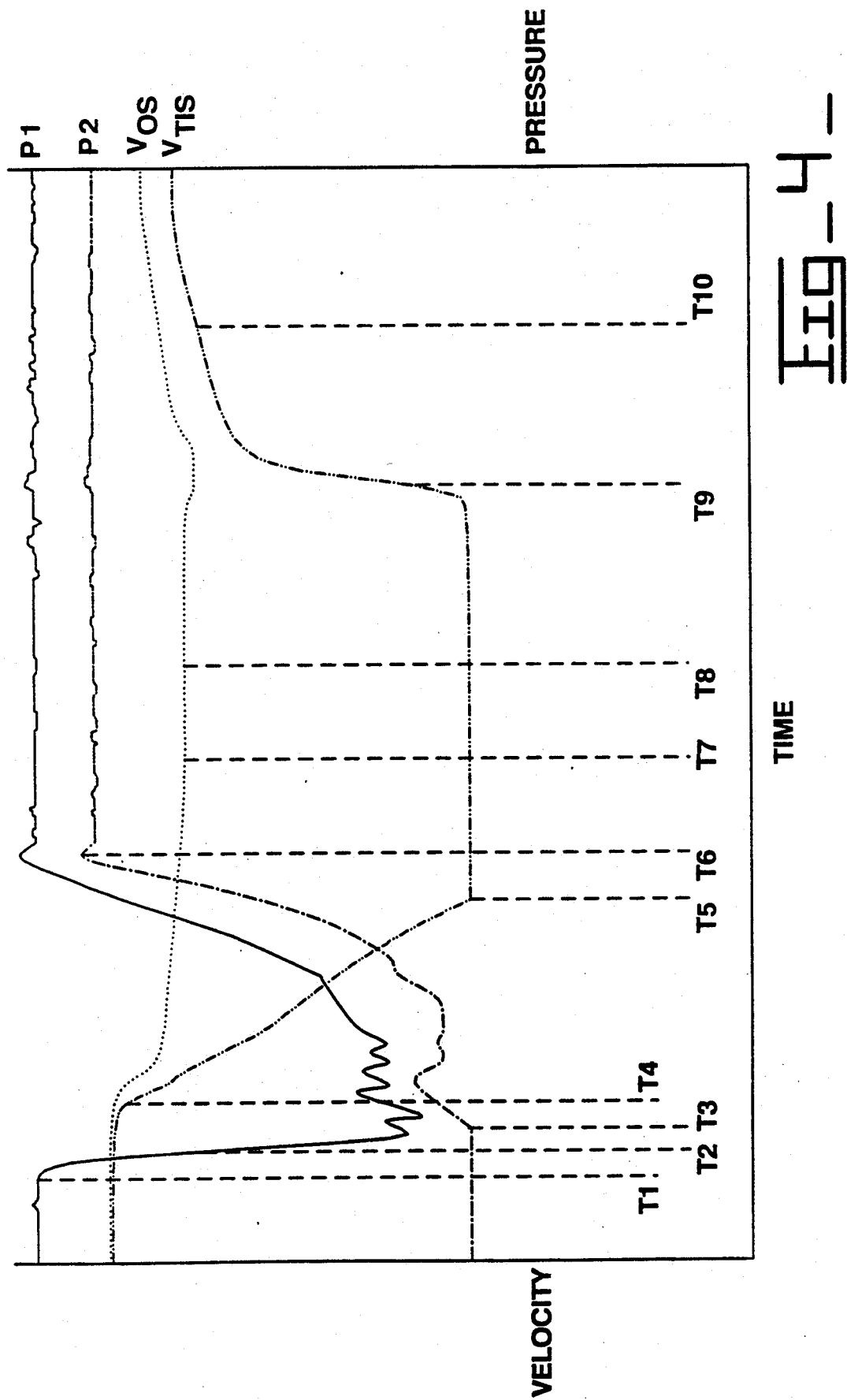
FIG. 4 is a sample graph, illustrating speed clutch pressure, directional clutch pressure, engine output shaft velocity, and transmission input shaft velocity during a slip test.

With reference to FIG. 4, after the slip tests are run, the microcomputer 202 calculates a set of powertrain parameters for each test and a series of reference times based on the digitized signals, $T1_n, T2_n, T3_n, T4_n, T5_n, T7_n, T9_n, T10_n$ (n being the slip test number, 1-12). The referenced times are measured from the beginning of each test.

After each slip test has begun, a running average of the directional clutch pressure, P1, the speed clutch pressure, P2, and the output shaft velocity are determined by the logic means 144. In the preferred embodiment, $T1_n$ is defined as the time at which P1 becomes less than 95% of the running average of P1. $T2_n$ is defined as the time at which P1 becomes less than 75% of the running average of P1. $T3_n$ is defined as the time at which P2 becomes 10% greater than the running average of P2. $T4_n$ is defined as the time at which the transmission input shaft velocity is less than 99% of the running average of the transmission input shaft velocity. $T5_n$ is defined as the time at which the velocity of the transmission input shaft 112 becomes zero. $T6_n$ is defined as the time at which the slope of one of the two pressures, P1 or P2 becomes negative.

In the preferred embodiment, $T7_n$ is defined as $T6_n$ plus 1 second and $T8_n$ as $T7_n$ plus 1 second. $T9_n$ and $T10_n$ define a recovery time period for the transmission input shaft 112 to accelerate between upper and lower limits (after the steering clutches have been disengaged).

In the preferred embodiment, $T9_n$ is defined as the time at which the transmission input shaft velocity reaches 50 RPM and $T10_n$ as the time at which the transmission input shaft velocity reaches 225 RPM for the low idle tests. For the high idle tests, $T9_n$ is defined as the time at which the transmission input shaft velocity reaches 100 RPM and $T10_n$ as the time at which the transmission input shaft velocity reaches 1900 RPM.

The times ($T1_n - T10_n$) defined above are referenced from an arbitrary point in time (typically, the time at which the test has begun). Also, the definition of each time is dependent on the configuration of the powertrain 102 and may vary.

The parameters calculated from the slip test data are:
Shift Initiation Time, $\Delta t1_n$
Speed Clutch Fill Time, $\Delta t2_n$
Directional Clutch Fill Time, $\Delta t3_n$
Transmission Pressure Modulation Time, $\Delta t4_n$
Transmission Slip Time, $\Delta t5_n$
Total Slip Time, $\Delta t6_n$
Torque Converter Output Shaft Recovery Time After Stall, $\Delta t7_n$
Engine Stall Velocity, $Ves_n$
Transmission P1 Stall Pressure, $sp1_n$
Transmission P2 Stall Pressure, $sp2_n$
Transmission Pressure P2 at Lockup, $tp_n$
Final Torque Converter Speed Ratio, $sr_n$
Final Directional Clutch Pressure, $P1fin_n$
Final Speed Clutch Pressure, $P2fin_n$ The calculations used to determine the time parameters are:

$$\Delta t1_n = T2_n - T1_n$$
$$\Delta t2_n = T3_n - T2_n$$
$$\Delta t3_n = T4_n - T3_n$$
$$\Delta t4_n = T6_n - T4_n$$
$$\Delta t5_n = T5_n - T4_n$$

-continued $$\Delta t6_n = T6_n - T2_n, \text{ and}$$
$$\Delta t7_n = T10_n - T9_n.$$

where, n is the slip test number, 1-12 (see FIG. 3).

$Ves_n$, $sp1_n$, and $sp2_n$ are the averages of the output shaft velocity, P1, and P2, respectively between $T9_n$ and $T10_n$. Transmission Pressure P2 at Lockup is measured at $T5_n$. The final torque converter speed ratio, $sr_n$, is the ratio of the output shaft velocity over the transmission input shaft velocity at the end of the test run (during steady-state). The final directional and speed clutch pressures, $P1fin_n$, $P2fin_n$ are the respective steady-state pressures at the end of each test.

Returning to FIG. 3, the powertrain conditions during the acceleration tests are shown. During the 6 acceleration tests, the engine 114 is accelerated from low idle to high idle and the powertrain conditions are varied from one test to the next to provide varying load scenarios, as shown.

With reference to FIG. 5, during each acceleration test, the output shaft velocity and the transmission input shaft velocity digitized signals are stored in the memory means 206 and may be displayed by the display means 208. From the digitized signals, an average torque converter acceleration, $TCacc_m$ and an average engine acceleration, $Eacc_m$ (for each acceleration test) are calculated based on the time required for the respective shaft (110,112) to accelerate between lower and upper velocity limits, $Vlower_m, Vupper_m$. A double stall velocity, Vds, is also calculated as the steady state final engine velocity of test number 15.

The engine acceleration average, is calculated by the formula:

$$\frac{Vupper_m - Vlower_m}{T12_m - T11_m}$$

The torque converter acceleration average is calculated by the formula:

$$\frac{Vupper_m - Vlower_m}{T14_m - T13_m},$$

where, m is the acceleration test number, 13-18.

After all the tests have been run, the powertrain parameters are stored in a data file in the memory means 206. The powertrain parameters may also be added to a time history data file which contains information relating to the health of the powertrain over its operating life, including the powertrain parameters calculated after each test. In the preferred embodiment, the logic means 144 is adapted to controllably display the history of each parameter contained in the time history data file.

The calculated powertrain parameters are compared to test data to assess specific characteristics of the powertrain and to produce error messages (signals). In one embodiment, the error messages are printed to one of the devices of the display means 208. In a second embodiment, the error messages are delivered to the memory means 206 and stored.

In the preferred embodiment, there is a maximum and minimum value associated with each parameter. A parameter is said to be "high" if it is greater than its maximum value, "low" if it is less than its minimum value and "ok" if it is between the maximum and minimum value.

In one embodiment, the maximum and minimum values are predetermined test values stored in the memory means 206. In a second embodiment, the maximum and minimum values have been modified by the parameter test data obtained over the operating life of the powertrain.

In the preferred embodiment, the assessed characteristics are:
engine output power
auxiliary power demand
torque converter input power demand
torque converter output power
transmission controls
transmission clutches, and
transmission power loss.

Figure 6A:
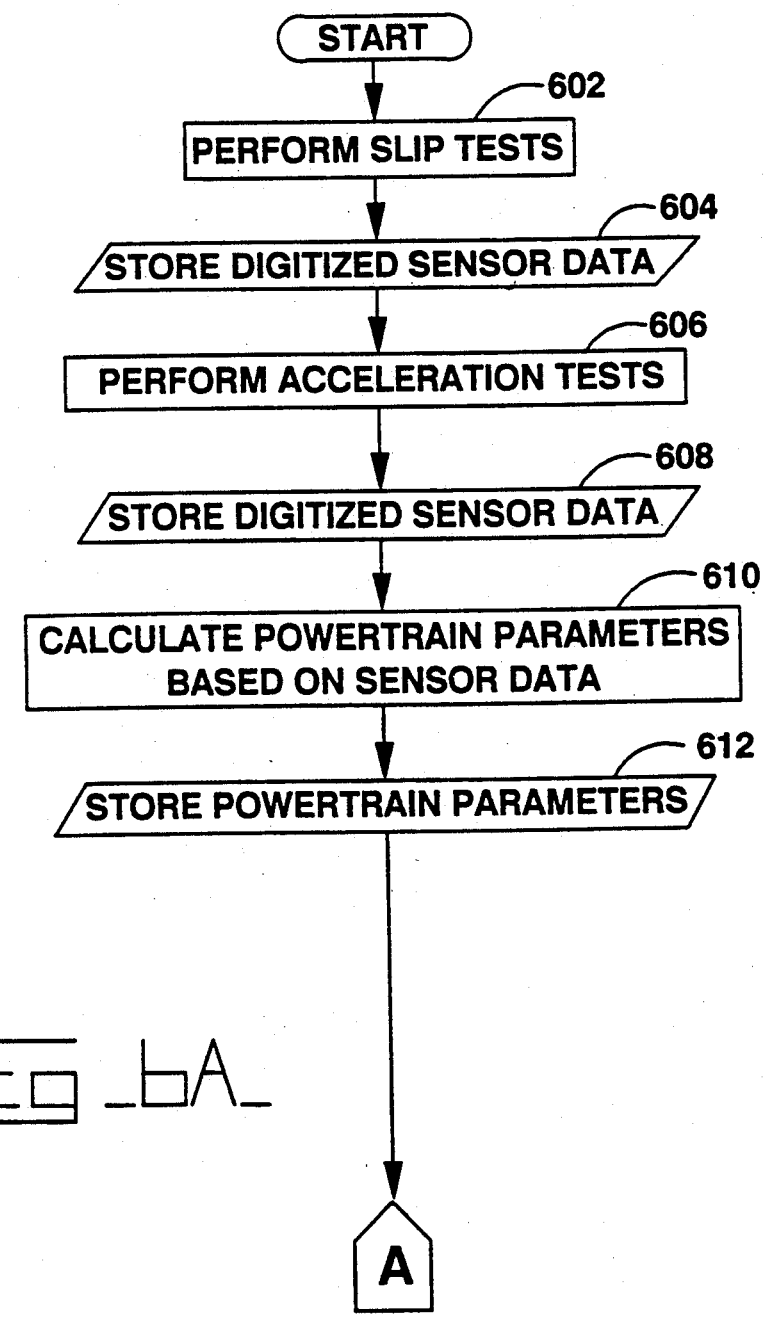
Figure 6D:
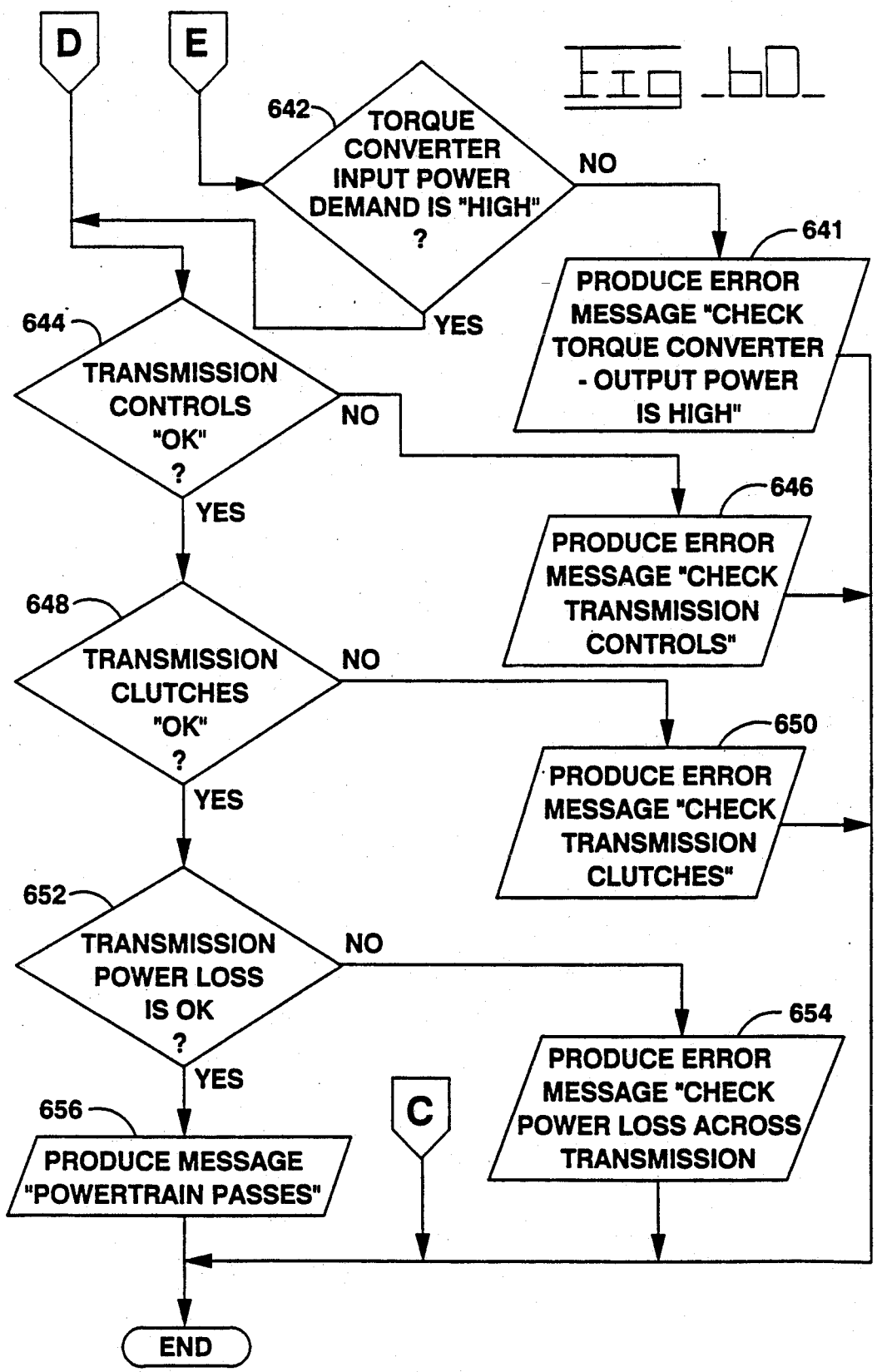

Referring to FIG. 6, the powertrain performance assessment system 100 collects data during the slip and acceleration tests and evaluates the powertrain characteristics based on the calculated powertrain parameters.

In a first control block 602, the slip tests are performed and in a second control block 604, the digitized signals are stored in the memory means 208. In a third control block 606, the acceleration tests are performed and in a fourth control block 608, the digitized signals are stored in the memory means 208. In a fifth control block 610, the powertrain parameters for each test are calculated and in a sixth control block 612, the powertrain parameters are stored in the memory means 208.

Then, engine power is evaluated.

---

Engine power is assessed as "LOW" if:
    all accelerations ($TCacc_m$ and
        $Eacc_m$, for $13 \leq m \leq 18$) are
        "low",
    AND
    all engine stall velocities ($Ves_n$, for
        $1 \leq n \leq 12$) are "low",
    AND
    all double stall velocities ($Vds$) are
        "low".
Engine power is assessed as "HIGH" if:
    all acceleration rates ($TCacc_m$ and
        $Eacc_m$, for $13 \leq m \leq 18$) are
        "high",
    AND
    all engine stall velocities ($Ves$,
        for $1 \leq n \leq 12$) are "high",
    AND
    all double stall velocities ($Vds$) are
        "high".
Engine power is assessed as "OK" if the
    engine power is neither "LOW" nor
    "HIGH".

---

Engine power is assessed as "OK" if the engine power is neither "LOW" nor "HIGH".

In a first decision block 614, if engine power is "OK", control goes to a second decision block 620. If engine power is not "OK" (that is, "HIGH" or "LOW") control goes to a third decision block 616.

In the third decision block 616, if the engine power is "HIGH" control goes to the second decision block 620. If the engine power is not "HIGH" (that is, "LOW"), control goes to a seventh control block 618.

In the seventh control block 618, the error message (signal), "CHECK ENGINE—POWER IS LOW " is produced.

Next, auxiliary power demand is evaluated.

---

Auxiliary power demand is "LOW" if:
    engine acceleration rate ($Eacc_{15}$) with
        implement hydraulics "ON" is
        "high" and the no load
        acceleration rate ($Eacc_{13}$) is
        "low" or "ok"
        OR
    all double stall velocities ($Vds$) are
        "high", and
    all engine stall velocities ($Ves_n$, for
        $1 \leq n \leq 12$) are "low" or "ok".
Auxiliary power demand is "HIGH" if:
    engine acceleration rate ($Eacc_{15}$) with
        implement hydraulics "ON" is
        "low" and no load acceleration
        rate ($Eacc_{13}$) is "high" or "ok"
        OR
    all double stall velocities ($Vds$) are
        "low" and
    all engine stall velocities ($Ves_n$, for
        $1 \leq n \leq 12$) are "high" or "ok".
Auxiliary power demand is "OK" if auxiliary power demand is neither "LOW" or "HIGH".

---

Auxiliary power demand is "OK" if auxiliary power demand is neither "LOW" nor "HIGH".

In the second decision block 620, if auxiliary power demand is "OK", control goes to a fourth decision block 628. If auxiliary power demand is not "OK", control goes to a fifth decision block 622.

In the fifth decision block 622, if auxiliary power demand is "HIGH", control goes to a sixth decision block 626. If the auxiliary power demand is not "HIGH", control goes to an eighth control block 624.

In the eighth control block 624, the error message (signal), "CHECK AUXILIARY LOAD—DEMAND IS LOW" is produced.

In the sixth decision block 626, if engine power is "HIGH", control goes to the fourth decision block 628. If engine power is not "HIGH" (that is, "LOW" or "OK") control goes to a ninth control block 625.

In the ninth control block 625, the error message (signal), "CHECK AUXILIARY LOAD—DEMAND IS HIGH" is produced.

Next, torque converter input power demand is evaluated.

---

Torque converter input power demand is "LOW" if:
    all engine stall velocities ($Ves_n$, for
        $1 \leq n \leq 12$) are "high", and the no
        load engine acceleration ($Eacc_{13}$)
        is "low" or "ok".
Torque converter input power demand is "HIGH" if:
    all engine stall velocities ($Ves_n$, for
        $1 \leq n \leq 12$) are "low", and the no
        load engine acceleration ($Eacc_{13}$)
        is "high" or "ok".
Torque converter input power demand is "OK" if the torque converter input power demand is neither "LOW" nor "HIGH".

---

Torque converter input power demand is "OK" if the torque converter input power demand is neither "LOW" nor "HIGH".

In the fourth decision block 628, if the torque converter input power demand is "OK" control goes to a seventh decision block 636. If the torque converter input power demand is "HIGH" or "LOW" control goes to an eighth decision block 630.

In the eighth decision block 630, if the torque converter input power demand is "HIGH", control goes to a ninth decision block 634. If the torque converter input power demand is not "HIGH", control goes to a tenth control block 632.

In the tenth control block 632, the error message "CHECK TORQUE CONVERTER—INPUT POWER DEMAND IS LOW" is produced.

In the ninth decision block 634, if engine power is "HIGH", control goes to the seventh decision block 636. If the engine power is not "HIGH", control goes to an eleventh control block 633.

In the eleventh control block 633, the error message "CHECK TORQUE CONVERTER—INPUT POWER DEMAND IS HIGH" is produced.

Next, the torque converter output power is evaluated.

Torque converter output power is "LOW" if:
all recovery times ($\Delta t7_n$, for $1 \leq n \leq 12$) are "high" and all torque converter accelerations ($Tacc_m$, for $16 \leq m \leq 18$) are "low".
Torque converter output power is "HIGH" if:
all recovery times ($\Delta t7_n$, for $1 \leq n \leq 12$) are "low" and all torque converter accelerations ($Tacc_m$, for $16 \leq m \leq 18$) are "high" and engine power is not "HIGH".
Torque converter output power is "OK" if torque converter output power is neither "LOW" nor "HIGH".

Torque converter output power is "OK" if torque converter output power is neither "LOW" nor "HIGH".

In the seventh decision block 636, if torque converter output power is "OK", control goes to a tenth decision block 644. If torque converter output power is "LOW" or "HIGH", control goes to an eleventh decision block 638. In the eleventh decision block 638, if the torque converter output power is "HIGH", control goes to a twelfth decision block 642. If the torque converter output power is not "HIGH", then control goes to a twelfth control block 640.

In the twelfth control block 640, an error message, "TORQUE CONVERTER OUTPUT POWER IS LOW" is produced.

In the twelfth decision block 642, if torque converter input power demand is "HIGH", control goes to the tenth decision block 644. If the torque converter input power demand is "LOW" or "OK" then control goes to a thirteenth control block 641.

In the thirteenth control block 641, an error message, "TORQUE CONVERTER OUTPUT POWER IS HIGH" is produced.

Next the transmission controller (130) is evaluated.

The transmission controller 130 is "OK" if:
all $P1fin_n$ and $P2fin_n$ (for $1 \leq n \leq 12$) are "ok",
all total slip times ($\Delta t6_n$, for $1 \leq n \leq 12$) are "ok",
all speed clutch fill times ($\Delta t2_n$, for $1 \leq n \leq 12$) are "ok", and
all directional clutch fill times ($\Delta t3_n$, for $1 \leq n \leq 12$) are "ok".

In the tenth decision block 644, if the transmission controller 130 is "OK", control goes to a thirteenth decision block 648. If the transmission controller 130 is not "OK", then control goes to a fourteenth control block 646.

In the fourteenth control block 646, an error message, "CHECK TRANSMISSION CONTROLS", is produced.

Next, the clutches 120,122,124,126,128 are evaluated.
The clutches are "OK", if all slip times are "ok".

In the thirteenth decision block 648, if the clutches are "OK" control goes a fourteenth decision block 652. If the clutches are not "OK", control goes to a fifteenth control block 650.

In the fifteenth control block 650, an error message, "CHECK TRANSMISSION CLUTCHES" is produced.

Next, the power loss across the transmission is evaluated.

The transmission power loss is "OK", if all torque converter recovery times ($\Delta t7_n$, for $1 \leq n \leq 12$) are "ok".

In the fourteenth decision block 652, if the transmission power loss is "OK", control goes to a sixteenth control block 656. If the transmission power loss is not "OK", control goes to a seventeenth control block 654.

In the sixteenth control block 656, the message "POWERTRAIN PASSES" is produced.

In the seventeenth control block 654, the error message, "CHECK TRANSMISSION POWERLOSS" is produced.

INDUSTRIAL APPLICABILITY

With reference to the drawings and in operation, the present invention is adapted to assess the performance of a vehicle's powertrain.

In the preferred embodiment, the powertrain performance assessment system, PPAS 100, is utilized on a regular basis during normal maintenance operations. The logic means 144 is implemented on a portable external data acquisition system (DAS). Pressure transducers or sensors 210C,210D provide the required pressure signals indicative of the speed clutch pressure and the directional clutch pressure. In one embodiment, the pressure sensors (210C,210D) are installed by removing plugs in the transmission 108 and installing hydraulic quick-couplers for connection to the sensors 210C,210D. The transmission input shaft velocity sensor 210B may also have to be installed. In another embodiment, appropriate sensors are installed and adapted to deliver signals to other electrical control modules, for example, the transmission controller 130 or the engine controller 116.

With the sensors 210A,210B,210C,210D installed, the logic means 144 displays a series of operating instructions to an operator for each test. For example, for test number 1, the operator is instructed to set the engine controller 116 in high idle (HI), engage the steering clutches and turn off the implement hydraulic system. With the brakes set and after a suitable amount of time to determine running averages of the received signals (as described above), the operator is instructed to shift the transmission 108 from the NEUTRAL position to the 3F position. The logic means 144 receives and stores the signals during the tests. In another embodiment, the logic means 144 is connected to the transmission controller 108 and automatically controls the shifting operation.

After each test, the logic means 144 compares the signals with upper and lower limits and warns the operator of any erroneous signal condition. The warning signal (message) may also be saved to the memory means 206. The logic means 144 also instructs the operator to rerun a test if necessary.

After each slip and acceleration test is completed successfully, the powertrain parameters are calculated and stored in the memory means 206. The powertrain parameters are also compared to upper and lower limits and the operator is informed of any parameters which are out of bounds. Likewise, these warnings may also be saved in the memory means 206.

After the powertrain parameters are calculated, the powertrain's performance is assessed, as described above and shown in FIG. 6. The logic means 206 produces messages on the display means 208 relating to the powertrain's performance (see above discussion). The messages may also be saved in the memory means 206 to complete the time history of the powertrain performance over its operating life.

We claim:

1. An apparatus for assessing the performance of a powertrain, said powertrain having a prime mover for rotating an output shaft, a torque converter unit driven by the output shaft, and a transmission having at least one directional clutch, one speed clutch, and a transmission input shaft driven by the torque converter unit, comprising:

means for sensing the rotational velocity of said output shaft and responsively producing an output shaft velocity signal;

means for sensing the rotational velocity of said transmission input shaft and responsively producing a transmission input shaft velocity signal;

means for sensing the pressure of said directional clutch and responsively producing a directional clutch pressure signal;

means for sensing the pressure of said speed clutch and responsively producing a speed clutch pressure signal; and logic means for receiving said speed clutch pressure signal, said directional clutch pressure signal, said output shaft velocity signal, and said transmission input shaft velocity signal, calculating a set of powertrain parameters as a function of the received signals and time, and producing an error signal in response to predetermined conditions of said powertrain parameters.

2. An apparatus, as set forth in claim 1, wherein said logic means includes:

means for receiving said output shaft velocity signal and producing a plurality of samples indicative of the magnitude of said output shaft velocity signal at discrete time intervals;

means for receiving said transmission input shaft velocity signal and producing a plurality of samples indicative of the magnitude of said transmission input shaft velocity signal at discrete time intervals;

means for receiving said directional clutch pressure signal and producing a plurality of samples indicative of the magnitude of said directional clutch pressure signal at discrete time intervals;

means for receiving said speed clutch pressure signal and producing a plurality of samples indicative of the magnitude of said speed clutch pressure signal at discrete time intervals; and, memory means for storing said speed clutch pressure samples, said directional clutch pressure samples, said output shaft velocity samples, and said transmission input shaft velocity samples.

3. An apparatus, as set forth in claim 1, wherein said logic means includes memory means for storing said powertrain parameters and producing a time history data file of said powertrain parameters.

4. An apparatus, as set forth in claim 3, wherein said logic means includes display means for producing visual representations of said time history data file.

5. An apparatus, as set forth in claim 1, wherein said logic means includes display means for producing visual representations of said received signals.

6. An apparatus, as set froth in claim 1, wherein said logic means includes display means for producing visual representations of said powertrain parameters.

7. An apparatus, as set forth in claim 1, wherein said logic means includes means for determining a set of reference time signals in response to said speed clutch pressure signal, said speed clutch pressure signal, said directional clutch pressure signal, said output shaft velocity signal, and said transmission input shaft velocity signal and wherein said set of powertrain parameters are calculated as a function of said received signals and said set of reference time signals.

8. An apparatus, as set forth in claim 1, wherein said set of powertrain parameters includes an engine stall velocity, a transmission stall pressure, a lockup transmission pressure, a final torque converter speed ratio, a final directional clutch pressure, and a final speed clutch pressure.

9. An apparatus, as set forth in claim 8, wherein said set of powertrain parameters further includes an average torque converter acceleration and an average engine acceleration.

10. An apparatus, as set forth in claim 1, wherein said set of powertrain parameters includes a set of time parameters.

11. An apparatus, as set forth in claim 10, wherein said set of time parameters includes a shift initiation time, a clutch fill time, a transmission pressure modulation time, a slip time, and a torque converter recovery time.

12. An apparatus for assessing the performance of a powertrain of a vehicle, said vehicle having a ground engaging means, said powertrain having a prime mover for rotating an output shaft, a torque converter unit driven by the output shaft and a transmission having at least one directional clutch and one speed clutch for delivering power to said ground engaging means, and a transmission input shaft driven by said torque converter unit, comprising:

means for sensing the rotational velocity of said output shaft and responsively producing an output shaft velocity signal;

means for sensing the rotational velocity of said transmission input shaft and responsively producing a transmission input shaft velocity signal;

means for sensing the pressure of said directional clutch and responsively producing a directional clutch pressure signal;

means for sensing the pressure of said speed clutch and responsively producing a speed clutch pressure signal; and logic means including:

means for receiving said speed clutch pressure signal, directional clutch pressure signal, output shaft velocity signal, and said transmission input shaft velocity signal, calculating a set of powertrain parameters based on the received signals;

means for producing an engine power error signal in response to predetermined conditions of said powertrain parameters;

means for producing a torque converter input power demand error signal in response to predetermined conditions of said powertrain parameters; and, means for producing a torque converter output power error signal in response to predetermined conditions of said powertrain parameters.

13. An apparatus, as set forth in claim 12, wherein powertrain includes a transmission controller for controllably engaging and disengaging said clutches and said logic means includes:

means for producing a transmission control error signal in response to predetermined conditions of said powertrain parameters; and means for producing a clutch error signal in response to predetermined conditions of said powertrain parameters.

14. An apparatus, as set forth in claim 12, wherein said prime mover is so constructed and adapted to provide power to an auxiliary load and said logic means includes means for producing an auxiliary power demand error signal in response to predetermined conditions of said powertrain parameters.

15. An apparatus, as set forth in claim 12, wherein said logic means includes means for producing a transmission power loss error signal in response to predetermined conditions of said powertrain parameters.

16. An apparatus, as set forth in claim 12, wherein said logic means includes:

means for receiving said output shaft velocity signal and producing a plurality of samples indicative of the magnitude of said output shaft velocity signal at discrete time intervals;

means for receiving said transmission input shaft velocity signal and producing a plurality of samples indicative of the magnitude of said transmission input shaft velocity signal at discrete time intervals;

means for receiving said directional clutch pressure signal and producing a plurality of samples indicative of the magnitude of said directional clutch pressure signal at discrete time intervals;

means for receiving said speed clutch pressure signal and producing a plurality of samples indicative of the magnitude of said speed clutch pressure signal at discrete time intervals; and, memory means for storing said speed clutch pressure samples, said directional clutch pressure samples, said output shaft velocity samples, and said transmission input shaft velocity samples.

17. An apparatus, as set forth in claim 12, wherein said logic means includes memory means for storing said powertrain parameters and producing a time history data file of said powertrain parameters.

18. An apparatus, as set forth in claim 17, wherein said logic means includes display means for producing visual representations of said time history data file.

19. An apparatus, as set forth in claim 12, wherein said logic means includes display means for producing visual representations of said received signals.

20. An apparatus, as set forth in claim 12, wherein said logic means includes display means for producing visual representations of said powertrain parameters.

21. An apparatus for assessing the performance of a powertrain of a vehicle, said vehicle having a ground engaging means, said powertrain having a prime mover for rotating an output shaft, an implement load connected to said output shaft, a torque converter unit driven by the output shaft, and a transmission having a transmission input shaft driven by the torque converter unit, and at least one directional clutch and one speed clutch for delivering power to said ground engaging means, and a transmission controller for controllably engaging and disengaging the clutches, comprising:

means for sensing the rotational velocity of said output shaft and responsively producing an output shaft velocity signal;

means for sensing the rotational velocity of said transmission input shaft and responsively producing a transmission input shaft velocity signal;

means for sensing the pressure of said directional clutch and responsively producing a directional clutch pressure signal;

means for sensing the pressure of said speed clutch and responsively producing a speed clutch pressure signal; and, logic means for receiving said speed clutch pressure signal, said directional clutch pressure signal, said output shaft velocity signal, and said transmission input shaft velocity signal, calculating a set of powertrain parameters based on the received signals, producing a power error signal in response to predetermined conditions of said powertrain parameters, producing a transmission control error signal in response to predetermined conditions of said powertrain parameters, producing a transmission powerloss error signal in response to predetermined conditions of said powertrain parameters, and producing a clutch error signal in response to predetermined conditions of said powertrain parameters.

22. A method for assessing the performance of a powertrain, said powertrain having a prime mover for rotating an output shaft, a torque converter unit driven by the output shaft, and a transmission having a transmission input shaft driven by the torque converter unit and at least one directional clutch and one speed clutch, comprising the steps of:

sensing the pressure of said speed clutch and responsively producing a speed clutch pressure signal;

sensing the pressure of said directional clutch and responsively producing a directional clutch pressure signal;

sensing the rotational velocity of said output shaft and responsively producing an output shaft velocity signal;

sensing the rotational velocity of said transmission input shaft and responsively producing a transmission input shaft velocity signal;

receiving said speed clutch pressure signal, said directional clutch pressure signal, said output shaft velocity signal, and said transmission input shaft velocity signal, responsively determining a set of reference time signals, and calculating a set of powertrain parameters based on the received signals and said reference time signals; and producing an error signal in response to predetermined conditions of said powertrain parameters.

23. A method, as set forth in claim 22, wherein said set of powertrain parameters includes an engine stall velocity, a transmission stall pressure, a lockup transmission pressure, a final torque converter speed ratio, a final directional clutch pressure, and a final speed clutch pressure.

24. A method, as set forth in claim 23, wherein said set of time parameters includes a shift initiation time, a clutch fill time, a transmission pressure modulation time, a slip time, and a torque converter recovery time.

25. A method, as set forth in claim 22, wherein said set of powertrain parameters includes a set of time parameters.

26. A method, as set forth in claim 25, wherein said set of powertrain parameters further includes an average torque converter acceleration and an average engine acceleration.

27. A method, as set forth in claim 22, including the steps of:
receiving said speed clutch pressure signal and producing a plurality of samples indicative of the magnitude of said speed clutch pressure signal at discrete time intervals;
receiving said directional clutch pressure signal and producing a plurality of samples indicative of the magnitude of said directional clutch pressure signal at discrete time intervals;
receiving said output shaft velocity signal and producing a plurality of samples indicative of the magnitude of said output shaft velocity signal at discrete time intervals;
receiving said transmission input shaft velocity signal and producing a plurality of samples indicative of the magnitude of said transmission input shaft velocity signal at discrete time intervals; and,
storing said speed clutch pressure samples, said directional clutch pressure samples, said output shaft velocity samples, and said transmission input shaft velocity samples.

28. A method, as set forth in claim 22, including the steps of storing said powertrain parameters and producing a time history data file of said powertrain parameters.

29. A method, as set forth in claim 28 including the step of producing visual representations of said time history data file.

30. A method, as set forth in claim 22, including the step of producing visual representations of said received signals.

31. A method, as set forth in claim 22, including the step of producing visual representations of said powertrain parameters.

32. A method for assessing the performance of a powertrain of a vehicle, said vehicle having a ground engaging means, said powertrain having a prime mover for rotating an output shaft, an implement load connected to said output shaft, a torque converter unit driven by the output shaft, and a transmission having a transmission input shaft driven by the torque converter unit and at least one directional clutch and one speed clutch for delivering power to said ground engaging means, comprising the steps of:
sensing the pressure of said speed clutch and responsively producing a speed clutch pressure signal;
sensing the pressure of said directional clutch and responsively producing a directional clutch pressure signal;
sensing the rotational velocity of said output shaft and responsively producing an output shaft velocity signal;
sensing the rotational velocity of said transmission input shaft and responsively producing a transmission input shaft velocity signal; and
receiving said speed clutch pressure signal, said directional clutch pressure signal, said output shaft velocity signal, and said transmission input shaft velocity signal, and calculating a set of powertrain parameters based on the received signals;
producing an engine power error signal in response to predetermined conditions of said powertrain parameters;
producing a torque converter input power demand error signal in response to predetermined conditions of said powertrain parameters; and,
producing a torque converter output power error signal in response to predetermined conditions of said powertrain parameters.

33. A method, as set forth in claim 32, wherein said powertrain includes a transmission controller for controllably engaging and disengaging said clutches and including the steps of:
producing a transmission control error signal in response to predetermined conditions of said powertrain parameters;
producing a clutch error signal in response to predetermined conditions of said powertrain parameters; and
producing a transmission power loss error signal in response to predetermined conditions of said powertrain parameters.

34. A method, as set forth in claim 32, wherein said prime mover is so constructed and adapted to provide power to an auxiliary load and including the step of producing an implement power demand error signal in response to predetermined conditions of said powertrain parameters.

35. A method, as set forth in claim 32, including the steps of storing said powertrain parameters and producing a time history data file of said powertrain parameters.

36. A method, as set forth in claim 35, including the step of producing visual representations of said time history data file.

37. A method, as set forth in claim 32, including the step of producing visual representations of said received signals.

38. A method, as set forth in claim 32, including the step of producing visual representations of said powertrain parameters.

39. A method for assessing the performance of a powertrain of a vehicle, said vehicle having a ground engaging means, said powertrain having a prime mover for rotating an output shaft, an implement load connected to said output shaft, a torque converter unit driven by the output shaft, a transmission having a transmission input shaft driven by the torque converter unit and having at least one directional clutch and one speed clutch for delivering power to said ground engaging means, and a transmission controller for controllably engaging and disengaging the clutches, comprising the steps of:
sensing the pressure of said speed clutch and responsively producing a speed clutch pressure signal;
sensing the pressure of said directional clutch and responsively producing a directional clutch pressure signal;
sensing the rotational velocity of said output shaft and responsively producing an output shaft velocity signal;

sensing the rotational velocity of said transmission input shaft and responsively producing a transmission input shaft velocity signal; and receiving said speed clutch pressure signal, said directional clutch pressure signal, said output velocity signal, and said transmission input velocity signal and calculating a set of powertrain parameters based on the received signals;

producing a power error signal in response to predetermined conditions of said powertrain parameters;

producing a transmission control error signal in response to predetermined conditions of said powertrain parameters;

producing a transmission power loss error signal in response to predetermined conditions of said powertrain parameters; and producing a clutch error signal in response to predetermined conditions of said powertrain parameters.

40. A method for assessing a powertrain, said powertrain having an engine for rotating an output shaft, an engine controller, a torque converter unit driven by the output shaft, a transmission having a transmission input shaft driven by the torque converter unit and having a directional clutch and at least one speed clutch, said speed and directional clutches so constructed and arranged to shift said transmission between a NEUTRAL position and at least one FORWARD and one REVERSE gear ratio positions, comprising the steps of:

performing a slip test;

sensing the pressure of said directional clutch during said slip test step and responsively producing a directional clutch pressure signal;

sensing the pressure of said speed clutch during said slip test step and responsively producing a speed clutch signal;

sensing the rotational velocity of said output shaft during said slip test step and responsively producing a first output shaft velocity signal;

sensing the rotational velocity of said transmission input shaft during said slip test step and responsively producing a first transmission input shaft velocity signal;

receiving said directional clutch pressure signal, speed clutch pressure signal, output shaft velocity signal and said transmission input shaft velocity signal, responsively determining a first set of reference time signals, and calculating a first set of powertrain parameters based on the received signals and said reference time signals;

performing an acceleration test;

sensing the rotational velocity of said transmission input shaft during said acceleration test step and responsively producing a second transmission input shaft velocity signal;

sensing the rotational velocity of said output shaft during said acceleration test step and responsively producing a second output shaft velocity signal;

receiving said second output shaft velocity signal and said second transmission input shaft velocity signal, responsively determining a second set of reference time signals, and calculating a second set of powertrain parameters based on the received signals and said second set of reference time signals; and producing an error signal in response to predetermined conditions of said first and second sets of said powertrain parameters.

41. The method, as set forth in claim 40, wherein said slip test step includes the steps of:

shifting said transmission to said NEUTRAL position;

setting the engine controller at a predetermined idle; and shifting said transmission to one of said FORWARD and REVERSE gear ratio positions.

42. The method, as set forth in claim 40, where said acceleration test step includes the steps of:

setting said engine controller at a first predetermined idle;

shifting said transmission to one of said NEUTRAL, FORWARD gear ratio, and REVERSE gear ratio positions, and transferring said engine controller to a second predetermined idle.

43. A method for assessing a powertrain, said powertrain having an engine for rotating an output shaft, an engine governor, a torque converter unit driven by the output shaft, and a transmission having a transmission input shaft driven by the torque converter unit and having at least one directional clutch and at least one speed clutch, said speed and directional clutches so constructed and arranged to shift said transmission between a NEUTRAL position and at least one FORWARD and one REVERSE gear ratio positions, comprising the steps of:

performing a slip test including the following steps:

shifting said transmission to said NEUTRAL position;

setting the engine controller at a predetermined idle;

shifting said transmission to one of said FORWARD and REVERSE gear ratio positions;

sensing the pressure of said directional clutch during said transmission shifting step and responsively producing a directional clutch pressure signal;

sensing the pressure of said speed clutch during said transmission shifting step and responsively producing a speed clutch signal;

sensing the rotational velocity of said output shaft during said transmission shifting step and responsively producing a first output shaft velocity signal;

sensing the rotational velocity of said transmission input shaft during said transmission shifting step and responsively producing a first transmission input shaft velocity signal;

receiving said directional clutch pressure signal, said speed clutch pressure signal, said first output shaft velocity signal and said first transmission input shaft velocity signal, responsively determining a first set of reference time signals, and calculating a first set of powertrain parameters based on the received signals and said first set of reference time signals;

performing an acceleration test including the following steps:

setting said engine controller at a predetermined idle;

shifting said transmission to one of said NEUTRAL, FORWARD gear ratio, and REVERSE gear ratio positions;

transferring said engine controller to a second predetermined idle;

sensing the rotational velocity of said transmission input shaft during said engine controller transferring step and responsively producing a second transmission input shaft velocity signal;

sensing the rotational velocity of said output shaft during said engine controller transferring step and responsively producing a second output shaft velocity signal; and receiving said second output shaft velocity signal and said second transmission input shaft velocity signal, responsively determining a second set of reference time signals, and calculating a second set of powertrain parameters based on said second set of reference time signals, the second transmission input shaft signal and the second output shaft signal; and producing an engine power error signal in response to predetermined conditions of said first and second sets of said powertrain parameters;

producing a torque converter input power demand error signal in response to predetermined conditions of said first and second sets of said powertrain parameters; and producing a torque converter output power error signal in response to predetermined conditions of said first and second sets of said powertrain parameters.

* * * * *